E. STEVENS.
TRUCK CONNECTION.
APPLICATION FILED MAY 1, 1913.
1,079,318.
Patented Nov. 18, 1913.
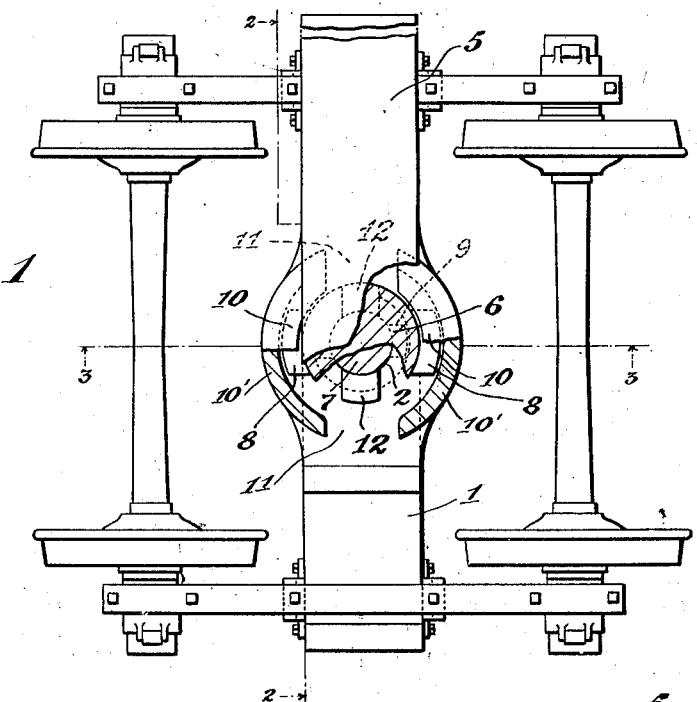
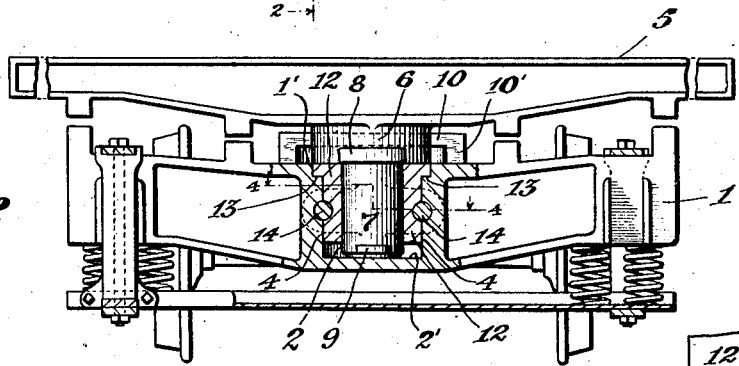
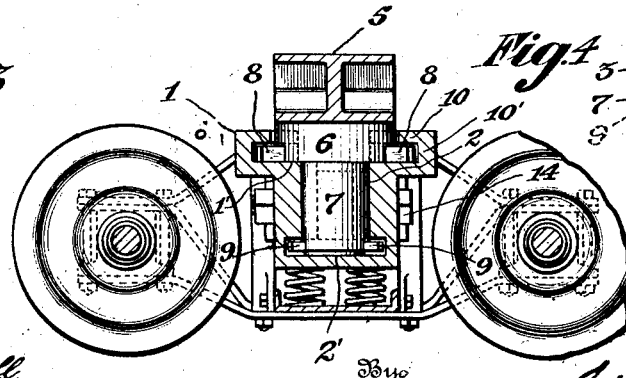
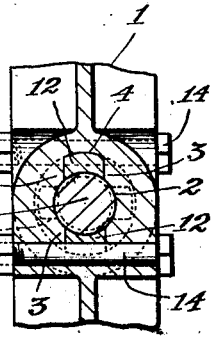
Inventor
Evie Stevens
Witnesses

UNITED STATES PATENT OFFICE.

EVIE STEVENS, OF STILLWATER, BRITISH COLUMBIA, CANADA.

TRUCK CONNECTION.

1,079,318.      Specification of Letters Patent.      Patented Nov. 18, 1913.

Application filed May 1, 1913. Serial No. 764,863.

*To all whom it may concern:*

Be it known that I, EVIE STEVENS, a citizen of the United States of America, and a resident of the city of Stillwater, in the Province of British Columbia and Dominion of Canada, have invented certain new and useful Improvements in Truck Connections, of which the following is a specification.

My invention relates to center connections for logging trucks, and it resides in the novel features, arrangements and combinations of parts hereinafter described, and succinctly defined in the annexed claims.

The primary object of the invention resides in the provision of an efficient and durable locking connection wherein the king bolt is eliminated and unauthorized displacement of the bunk obviated.

For a full understanding of the present invention reference is to be had to the following description and the accompanying drawing, in which—

Figure 1 is a plan view of a truck embodying my invention, some of the parts being broken away; Fig. 2 is a section on line 2—2 of Fig. 1, the center bearing being in elevation, Fig. 3 is a similar view taken on line 3—3 of Fig. 1, and Fig. 4 is a view taken along line 4—4 of Fig. 2.

Referring in detail to the drawing, 1 indicates the truck bolster supported in the usual manner on the diamond arch bar type of truck frame. The bolster is provided with a central recess 2 having on its inner wall the locking lugs 3 which are spaced to form the grooves 4.

On the bunk 5, I provide a center bearing comprising a hub 6 resting on its bearing 1' and a reduced hub section 7 depending from said hub 6 and having its bearing 2' in the recess 2 of the bolster. The hub 6 and the depending section 7 are each provided with oppositely extending locking shoulders 8, 9, respectively, the last mentioned shoulders operating in the annular groove or space between the lugs 3 and the bearing 2' and having access thereto through grooves 4. The shoulders 8 engage beneath the flanges 10 extending inwardly from upward projections 10' carried by the bolster, said shoulders entering beneath the flanges 10 through the spaces 11. The shoulders 8, 9, fit freely beneath their corresponding locking elements to permit of vertical play between the bunk and bolster. When the bunk is in its normal position the shoulders 8 and 9 are disposed at right angles to the spaces 11 and grooves 4, whereby an abnormal disposition of the bunk is requisite to effect a displacement of the center bearing.

To prevent any displacement whatever of the hub, locking pins or plugs 12 are inserted in the grooves 4 to fill or close the latter, and comprise headed stems, the heads thereof seating in the pockets 13, leading from the said grooves, for supporting the stems. The stems of each pin has formed therein a semicircular recess adapted to register with a bore in the bolster for the reception of a bolt 14 which retains the pin from vertical displacement, as is obvious.

In placing the bunk to the truck, the former is presented crosswise of the bolsters for clear passage of the shoulders 8, 9 between their corresponding locking elements and, after mounting the pins 12 on the shoulders 9, is lowered to seat the hub sections on their respective bearings. Prior to the seating of the central bearing the heads of the pins engage in pockets 13 to retain the lower terminals of pins 12 clear of shoulders 9 whereby vertical play between the bolster and bunk may be had in any disposition of the latter.

Having thus described my invention what I claim as new, and desire to secure by Letters Patent of the United States of America, is:—

1. In combination with a truck having a central recess and a rotatably supported bunk on the truck, spaced locking elements on said truck, spaced locking elements on the bunk engaging beneath those on the truck, and a central bearing on said bunk and projecting below the aforesaid locking elements into the recess in the truck.

2. In combination with a truck and a rotatably supported bunk thereon, spaced locking elements on the truck, spaced locking elements on said bunk engaging under the first named locking elements, and means for closing the space between certain of said locking elements to prevent the dislodging of the second named locking elements from under the first named locking elements.

3. In combination with a truck and a rotatably supported bunk thereon, spaced locking elements on the truck, spaced locking elements on the bunk and engaging beneath the first mentioned locking elements, and means coöperating with certain of said locking elements to prevent displacement of said bunk in any disposition.

4. In combination with a truck and a rotatably supported bunk thereon, spaced locking elements on the truck, spaced locking elements on the bunk and normally engaging under the first mentioned locking elements, and locking pins interposed between certain of said locking elements.

5. In combination with a truck and a rotatably supported bunk thereon, spaced locking elements on the truck, spaced locking elements on the bunk and normally engaging under the first mentioned locking elements, a locking pin interposed between certain of said locking elements to diminish the space therebetween, and means engaging the pin to prevent dislodgment thereof.

6. In combination with a truck and a rotatably supported bunk thereon, spaced locking elements on said truck, spaced locking elements on said bunk, a locking pin insertible between certain of said locking elements, and a transversely disposed bolt engaging said pin.

7. In combination, a truck having a central recess, spaced locking elements mounted within the recess of the truck, the latter having offset pockets between the locking elements, a bunk rotatably mounted on the truck, spaced locking elements on said bunk normally engaging beneath the first named locking elements, locking pins interposed between the first named locking elements and provided with enlargements engaging in the offset pockets of the truck, and means for retaining the pins from dislodgment.

Signed at Seattle, Wn., this 18th day of April 1913.

EVIE STEVENS.

Witnesses:
 WALTER G. McLEAN,
 J. M. SPARKMAN.